United States Patent [19]

Menovcik et al.

[11] Patent Number: 5,744,550
[45] Date of Patent: Apr. 28, 1998

[54] CURABLE COATING COMPOSITIONS CONTAINING CARBAMATE ADDITIVES

[75] Inventors: Gregory G. Menovcik, Farmington Hills; Walter H. Ohrbom, Commerce; John W. Rehfuss, West Bloomfield, all of Mich.

[73] Assignee: BASF Corporation, Southfield, Mich.

[21] Appl. No.: 333,917

[22] Filed: Nov. 3, 1994

[51] Int. Cl.$^6$ ........................ C08L 29/02
[52] U.S. Cl. ................. 525/162; 525/157; 525/443
[58] Field of Search ................. 525/162, 157, 525/443

[56] References Cited

U.S. PATENT DOCUMENTS

| | | |
|---|---|---|
| 3,464,938 | 9/1969 | Nordstrom . |
| 4,279,833 | 7/1981 | Culbertson et al. ............ 260/464 |
| 4,677,168 | 6/1987 | Hoy et al. . |
| 4,814,382 | 3/1989 | Hoy et al. ...................... 525/113 |
| 5,098,947 | 3/1992 | Metzger et al. ................ 524/507 |
| 5,115,015 | 5/1992 | Richey, Jr. et al. ............ 524/507 |
| 5,134,205 | 7/1992 | Blank . |
| 5,158,808 | 10/1992 | Hoy et al. ...................... 427/385.5 |
| 5,356,669 | 10/1994 | Rehfuss et al. ................. 427/407.1 |
| 5,412,049 | 5/1995 | Argyropoulos et al. ........ 526/312 |

FOREIGN PATENT DOCUMENTS

| | | | |
|---|---|---|---|
| WO 94/10211 | 11/1994 | European Pat. Off. .......... C08F 8/30 |
| WO 94/10212 | 11/1994 | European Pat. Off. .......... C08F 8/30 |
| WO 94/10213 | 11/1994 | European Pat. Off. .......... C08F 8/30 |

*Primary Examiner*—Fred Zitomer
*Attorney, Agent, or Firm*—Anne Gerry Sabourin

[57] ABSTRACT

Curable coating compositions are described comprising
(a) a polymer resin comprising active hydrogen-containing functional groups other than carbamate,
(b) a curing agent having groups that are reactive with said functional groups on (a), and
(c) a compound having a molecular weight of from 75 to 2000 comprising at least one group of the formula:

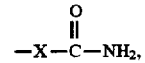

wherein X is O or NH and either (a), (b), or both (a) and (b) comprise groups that are reactive with said group on (c).

18 Claims, No Drawings

5,744,550

CURABLE COATING COMPOSITIONS CONTAINING CARBAMATE ADDITIVES

FIELD OF THE INVENTION

This invention relates to coating compositions, especially compositions for high-gloss topcoats, and more especially the clearcoat of color-plus-clear composite coatings.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

Many curable coating compositions utilize a hydroxy-functional polymer resin such as a hydroxy-functional acrylic and a curing agent such as an aminoplast. These coating compositions suffer from environmental etch in certain topcoat applications. In spite of this, it is often desirable to use coatings based on hydroxy-functional or other active hydrogen-functional resins, as there exists a great deal of experience with these coatings, and many multilayer coating systems have incorporated this chemistry into one or more of the layers. It is also desirable to use such coatings for various applications such as basecoat and primer to provide durable coatings. It is especially desirable to utilize such coating compositions in high gloss topcoats, such as the clearcoat of a color-plus-clear composite coating, while also providing resistance to environmental etch.

U.S. Pat. Nos. 4,814,382, 5,114,015, and 5,158,808 describe the use of certain N-alkyl carbamate compounds as reactive diluents in coating compositions having OH-functional curable polymer resins. These compounds, however, may require excessively-high catalyst or temperature levels in order to fully react into the crosslink matrix during cure of the film

SUMMARY OF THE INVENTION

It has now been discovered that incorporating compounds comprising at least one primary carbamate or urea group into such coating compositions can provide improved resistance to environmental etch. Thus, according to the present invention, there is provided a curable coating composition comprising (a) a polymer resin comprising active hydrogen-containing functional groups other than carbamate,
(b) a curing agent having groups that are reactive with said functional groups on (a), and
(c) a compound having a molecular weight of from 75 to 2000 comprising at least one group of the formula:

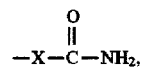

wherein X is O or NH and either (a), (b), or both (a) and (b) comprise groups that are reactive with said group on (c).

In another embodiment, the invention is directed toward a coating method wherein the above-described coating composition is coated onto a substrate and cured at a temperature of less than 150° C.

DESCRIPTION OF THE PREFERRED EMBODIMENTS

The composition according to the present invention comprises a polymer resin (a) having active hydrogen-containing functional groups other than carbamate. Such polymer resins include, for example, acrylic polymers, modified acrylic polymers, polyesters, polyepoxides, polycarbonates, polyurethanes, polyamides, polyimides, and polysiloxanes, all of which are well-known in the art. Preferably, the polymer is an acrylic, modified acrylic or polyester. More preferably, the polymer is an acrylic polymer. Active hydrogen-containing functional groups on polymer resins are well-known in the art. Such groups include, for example, hydroxyl groups, amino groups, thiol groups, hydrazide groups, and activated methylene groups.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as the polymer (a) according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

The composition of the invention is cured by a reaction of the active hydrogen-functional compound (a) with a component (b) having a plurality of functional groups that are reactive with the active hydrogen groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

The compounds useful as component (c) according to the invention can be prepared in a variety of ways. Simple commercially-available carbamate or urea compounds such as butyl carbamate, hydroxypropyl carbamate, hydroxybutyl carbamate, or hydroxyethylethylene urea may be used in the present invention as component (c). However, it may often be desirable to avoid the inclusion of hydroxyl groups, as they may lead to the formation of vulnerable ether bridges during cure. The carbamate is primary, terminating in an —$NH_2$ group. One way to prepare compounds useful as component (c) is to react an alcohol ('alcohol is defined herein as having one or more OH groups) with urea to form a compound with carbamate group(s). This reaction is accomplished by heating a mixture of the alcohol and urea. Another technique is the reaction of an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of an alcohol with phosgene and then a primary amine to form a compound having secondary carbamate group(s). Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as component (c) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

The compound (c) will generally have a molecular weight of 75–2000, and preferably from 75–1500. The glass transition temperature, $T_g$, of components (a), (b), and (c) can be adjusted to achieve a cured coating having the $T_g$ for the particular application involved. The compound (c) is preferably used at levels between 3 to 50 percent (based on total resin solids of the coating composition), and more preferably between 5 to 25 percent.

According to the present invention, component (a), component (b), or both components (a) and (b) must have at least one group thereon that is reactive with the carbamate group(s) on component (c). This is preferably accomplished through the selection of an aminoplast as component (b). Depending on the cure conditions, other compounds identified above as component (b) may also be reactive with the carbamate group(s) on component (c). Component (a) may also contain groups that are reactive with carbamate, such as an acrylic polymer containing isobutoxymethyl acrylamide groups.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional compound (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (c) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples.

PREPARATION 1

Hydroxy Functional Acrylic Resin

A three-neck round-bottom flask was fitted with a condenser, stirrer, nitrogen inlet tube and thermocouple. This reactor was loaded with 23.98 grams of solvesso 100 and 2.72 grams of xylene. The solvent in the reactor was blanketed with nitrogen and heated to (156.0°–158.0° C.). At the same time, the following monomers were charged to the monomer addition tank.

| Monomer description | Weight in grams |
| --- | --- |
| methacrylate hydroxypropyl | 25.32 |
| n-butyl acrylate | 22.93 |
| styrene | 15.27 |
| methacrylic acid | 1.42 |
| Solvesso ® 100 | 0.50 |

After all the monomers were charged to the monomer tank, the solution was mixed thoroughly and kept under agitation during the addition. To the initiator tank the following were charged.

| Initiator description | Weight in grams |
|---|---|
| dicumylperoxide/aromatic 100 | 5.00 |
| di-t-butylperoxide | 0.09 |
| Solvesso® 100 | 1.45 |

After all the components were added to the initiator tank, the solution was mixed thoroughly and kept under agitation during the addition. When the solvents in the reactor reached reflux temperature, the nitrogen blanket was turned off. The addition of the monomer feed was started and simultaneously the initiator added over a four hour period, maintaining an even addition rate. After the addition was complete, both the monomer and initiator addition lines were flushed with 7.24 grams of Solvesso® 100. The reaction was maintained at reflux for an additional hour. After this hold period was over, the batch was cooled to 87.0° C., and the nitrogen blanket started until the reaction came to room temperature at which time the nitrogen blanket was turned off.

PREPARTION 2

Hydroxy Functional Acrylic Resin

A three neck round bottom flask was fitted with a condenser, stirrer, nitrogen inlet tube and thermocouple. This reactor was loaded with 13.06 grams of acetate primaryamyl-mixed isomers and 8.21 grams of xylene. The solvent in the reactor was blanked with nitrogen and heated to reflux (142°–144° C.). At the same time, the following monomers were charged to the monomer addition tank.

| Monomer description | Weight in grams |
|---|---|
| methacrylate isodecyl | 20.62 |
| methacrylate isobornyl | 15.16 |
| methacrylate hydroxyethyl | 23.65 |
| methacrylic acid | 1.21 |
| xylene | 0.50 |

After all the monomers were charged to the monomer tank, the solution was mixed thoroughly and kept under agitation during the addition. To the initiator tank the following were charged.

| Initiator description | Weight in grams |
|---|---|
| butylperoxyacetate (t-butyl) | 5.0 |
| xylene | 5.0 |

After all the components were added to the initiator tank, the solution was mixed thoroughly and kept under agitation during the addition. When the solvents in the reactor reached reflux temperature, the nitrogen blanket was turned off. The addition of the monomer feed was started and the initiator simultaneously added over a four hour time period, maintaining an even addition rate while maintaining the reflux temperature. After the addition was complete, both the monomer and initiator addition lines were flushed with 6 grams of xylene. After flushing both monomer and initiator feed lines, the reaction was held at 142° C. for an additional thirty minutes. During the thirty minute hold, 0.66 g of xylene and 1.21 g of butylperoxyacetate were added to the initiator tank. After the thirty minute hold was complete, the remaining initiator was charged to the batch (this portion is used as a scavenger for residual monomers). The mixture was held for an additional thirty minutes, and then cooled to room temperature.

EXAMPLE 1

The clearcoat formulation was prepared by adding the following ingredients in order under agitation. After all the components wwere added and mixed thoroughly, the paint was filtered into a container for later use.

| Ingredients | Parts by weight |
|---|---|
| 1. Hydroxyl functional acrylic resin see Example 1. | 50.91 |
| 2. Nacure® XP-243 blocked acid catalysts | 1.26 |
| 3. Tinuvin® 1130 benzotriazole UVA light stabilizer | 2.36 |
| 4. Tinuvin® 123 N-alkoxy hindered amine | 0.94 |
| 5. Xylene | 0.20 |
| 6. Melamine x-linker Resimene® 755. | 20.44 |
| 7. Polybutyl acetate | 0.52 |
| 8. Alcohol, denatured-hydrousethyl | 2.0 |
| 9. N-Butyl alcohol/normal butanol | 4.2 |
| 10. Butyl carbamate | 3.2 |
| 11. Rheology control agent. | 16.9 |

The functionality of the reactive intermediate (IR) can be as low as monofunctional and as high as tetrafunctional. These RI can vary in molecular weight from 50 Mw to as high as 3000 Mw. Other examples of reactive intermediates are and derivatives of these with di and tri functional isocyanates.

EXAMPLE 2

The clearcoat formulation was prepared by adding the following ingredients in order under agitation. After all the components are added and mixed thoroughly the paint is filtered into a container for later use.

| Ingredients | Parts by weight |
|---|---|
| 1. Hydroxyl functional acrylic resin see Example 1 or example 2. | 433.6 |
| 2. Hydroxy propyl carbamate reactive intermediate. | 95.2 |
| 3. Melamine x-linker Cymel® 303 | 187.2 |
| 4. Tinuvin® 123 N-alkoxy hindered amine | 5.4 |
| 5. Tinuvin® 384B UVA light stabilizer | 18.8 |
| 6. Nacure® xp-243 blocked acid catalysts | 15.6 |
| 7. Exxate® 600 high-boiling alkyl acetates of primary alcohols. | 185.0 |
| 8. N-Butyl alcohol | 10.0 |

EXAMPLE 3

The clearcoat formulation was prepared by adding the following ingredients in order under agitation. After all the components are added and mixed the paint is filtered into a container for later use.

| Ingredients | Parts by weight |
|---|---|
| 1. Hydroxyl functional acrylic resin see Example 1. | 543.2 |
| 2. Hydroxy propyl carbamate | 95.2 |
| 3. Melamine x-linker Cymel® 303 | 187.2 |
| 4. Tinuvin® 123 N-alkoxy hindered amine | 6.6 |
| 5. Tinuvin® 384B UVA light stabilizer | 22.8 |
| 6. Nacure® xp-243 blocked acid catalysts | 18.4 |
| 7. Exxate® 600 high-boiling alkyl acetates of | 200.5 |

| Ingredients | Parts by weight |
|---|---|
| primary alcohols. | |
| 8. N-Butyl alcohol | 10.0 |

EXAMPLE 4

The clearcoat formulation was prepared by adding the following ingredients in order under agitation. After all the components are addded and mixed throughly the paint is filtered into a container for later use.

| Ingredients | Parts by weight |
|---|---|
| 1. Hydroxyl functional acrylic resin see Example 1. | 50.91 |
| 2. Nacure ® XP-243 blocked acid catalysts | 1.26 |
| 3. Tinuvin ® 1130 benzotriazole UVA light stabilizer | 2.36 |
| 4. Tinuvin ® 123 N-alkoxy hindered amine (DS2967). | 0.94 |
| 5. Xylene | 0.20 |
| 6. Melamine x-linker Resimene ® 755. | 20.44 |
| 7. Flow agent PBA. | 0.52 |
| 8. Alcohol, denatured-hydrousethyl | 2.0 |
| 9. N-Butyl alcohol | 4.2 |
| 10. Butyl carbamate | 6.39 |
| 11. Rheology control agent. | 16.9 |

The above coating compositions were sprayed onto primed steel panels as clearcoats of a composite color-plus-clear coating along with a black basecoat utilizing a hydroxy-functional acrylic with a melamine crosslinker. The panels were cured for 20 minutes at 135° C. metal temperature, and evaluated for acid spot, solvent resistance, and environmental etch.

Acid spot was evaluated on a scale of 1–60 with 1 being best and 60 being worst. A series of strong acid, bases and organic compositions were repared at standard solution. These compositions were applied drop wise to each panel (approximately three drops from a pipette) and heated, first 20 minutes at 120° F. then 30 minutes at 120° F. The panels were then washed of excess test solution and rated.

Solvent resistance was evaluated on a scale of 0–5 with 5 being best and 0 being worst. The procedure for running the test consists of the following steps. First, four layers of cheesecloth were placed on the end of a ball hammer held in place with rubber bands. Second, the clothed end was dipped into methylethyl ketone (MEK) and placed on the panel. Third, using back and fourth motion as one double rub rub, fifty double rubs were made over the panel in the same place. Fourth, after fifty counts, the panels were rated.

| Rating | Appearance |
|---|---|
| 0 | Through to basecoat |
| 1 | Severe scratching |
| 2 | Moderate Scratching |
| 3 | Slight scratching |
| 4 | Very little to no Scratching |
| 5 | No visible Scratching |

The panels were evaluated for environmental etch after being exposed to the elements at one of the automotive OEM etch evaluation sites at Jacksonville, Fla. Etch was rated on a scale of 1–100 with 1 being best and 100 being worst. A "+" was given to the rating to designate that the coating system was so bad that it could not be rated on the same scale.

| Rating | Description |
|---|---|
| 1–3 | Etch is not noticeable to observation on a clear sunny day. |
| 4–6 | Etch is only noticeable to a person trained at observing defect. |
| 7–9 | Etch is noticeable to a person not trained at observing defect. |
| 10 | Etch is extremely noticeable. |
| 10+ | System is a total failure toward etch testing. |

| | ETCH | | | | Solvent | Acid |
|---|---|---|---|---|---|---|
| | 2 Wk | 4 Wk | 8 Wk | 14 Wk | Rub | Spot |
| Testing Round 1 | | | | | | |
| Example 1 | 6 | 7 | 7 | 10 | 5 | 20 |
| Example 2 | 6 | 6 | 8 | 10 | 5 | 25 |
| Example 3 | 7 | 7 | 10 | 25 | 3 | 28 |
| Control (no carbamate) | 8 | 8 | 10 | 28 | 4 | 28 |
| | 2 Wk | 4 Wk | 10 Wk | | | |
| Testing Round 2 | | | | | | |
| Example 4 | 1 | 4 | 5 | | 5 | 20 |
| Control (no carbamate) | 3 | 8 | 10 | | 4 | 29 |

The etch results showed noticeable improvements in solvent resistance, acid spot, and environmental etch compared to the control.

The invention has been described in detail with reference to preferred embodiments thereof. It should be understood, however, that variations and modifications can be made within the spirit and scope of the invention.

What is claimed is:

1. A curable coating composition comprising
   (a) a polymer resin comprising active hydrogen-containing functional groups other than carbamate,
   (b) a curing agent having groups that are reactive with said functional groups on (a), and
   (c) a compound having a number average molecular weight of from 75 to 2000 comprising at least one group of the formula:

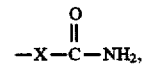

wherein X is O or NH and either (a), (b), or both (a) and (b) comprise groups that are reactive with said group on (c).

2. A curable coating composition according to claim 1 wherein the compound (C) has a number average molecular weight of from 75 to 1500.

3. A curable coating composition according to claim 1 wherein the compound (c) is a hydroxyalkyl mono or polycarbamate.

4. A curable coating composition according to claim 1 wherein polymer resin (a) comprises hydroxyl active hydrogen functional groups.

5. A curable coating composition according to claim 4 wherein the curing agent (b) is an aminoplast.

6. A curable coating composition according to claim 5 wherein the aminoplast is a melamine formaldehyde resin.

7. A curable coating composition according to claim 1 wherein the curing agent (b) is an aminoplast.

8. A curable coating composition according to claim 7 wherein the aminoplast is a melamine formaldehyde resin.

9. A curable coating composition according to claim 1 wherein the compound (c) is present at 3–50 weight percent of total resin solids in the coating composition.

10. A curable coating composition according to claim 1 wherein the polymer resin (a) is an acrylate or methacrylate polymer.

11. A curable coating composition according to claim 1 wherein the compound (c) comprises a single carbamate group.

12. A curable coating composition according to claim 1 wherein the compound (c) comprises at least 2 carbamate groups.

13. A curable coating composition according to claim 1 wherein components (a), (b), and (c) are dispersed in an organic solvent medium.

14. A curable coating composition according to claim 1 wherein components (a), (b), and (c) are dispersed in an aqueous medium.

15. A curable coating composition according to claim 1 wherein components (a), (b), and (c) are in the form of a powder.

16. A curable coating composition according to claim 1, further comprising from 0.5 to 0.75% of a blocked acid cure catalyst.

17. A curable coating composition according to claim 1 wherein X is O.

18. A curable coating composition according to claim 1 wherein X is NH.

* * * * *